(12) United States Patent  (10) Patent No.: US 8,844,015 B2
Pendergrass et al.  (45) Date of Patent: Sep. 23, 2014

(54) APPLICATION-ACCESS AUTHENTICATION AGENT

(75) Inventors: Eric Addkison Pendergrass, Fort Collins, CO (US); Matthew D. Wood, Broomfield, CO (US); Justin P Walsh, Fort Collins, CO (US); Davuth Te, Denver, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/362,290

(22) Filed: Jan. 31, 2012

(65) Prior Publication Data

US 2013/0198828 A1   Aug. 1, 2013

(51) Int. Cl.
G06F 17/30 (2006.01)
H04L 29/06 (2006.01)

(52) U.S. Cl.
CPC ............ H04L 63/08 (2013.01); H04L 63/0823 (2013.01)
USPC ..................... 726/10; 726/3; 726/5

(58) Field of Classification Search
CPC ...... H04L 63/08; H04L 63/0823; H04L 63/20
USPC ................ 726/3–12; 709/217–219, 225–229; 713/156, 158
See application file for complete search history.

(56) References Cited

U.S. PATENT DOCUMENTS

| | | | |
|---|---|---|---|
| 7,089,584 B1 * | 8/2006 | Sharma | 726/4 |
| 7,458,095 B2 | 11/2008 | Forsberg | |
| 7,877,492 B2 | 1/2011 | Chawla et al. | |
| 8,046,579 B2 * | 10/2011 | Kresina | 713/155 |
| 8,245,285 B1 * | 8/2012 | Ravishankar et al. | 726/9 |
| 2001/0044894 A1 * | 11/2001 | Saito et al. | 713/156 |
| 2002/0120685 A1 * | 8/2002 | Srivastava et al. | 709/203 |
| 2003/0005117 A1 * | 1/2003 | Kang et al. | 709/225 |
| 2003/0014368 A1 * | 1/2003 | Leurig et al. | 705/64 |
| 2003/0028805 A1 * | 2/2003 | Lahteenmaki | 713/201 |
| 2003/0065623 A1 * | 4/2003 | Corneil et al. | 705/64 |
| 2005/0149723 A1 * | 7/2005 | Watkins et al. | 713/156 |
| 2005/0154785 A1 * | 7/2005 | Reed et al. | 709/217 |
| 2005/0273495 A1 * | 12/2005 | Faruqi et al. | 709/206 |
| 2006/0036850 A1 * | 2/2006 | Enokida | 713/156 |
| 2006/0075475 A1 * | 4/2006 | Boulos et al. | 726/6 |
| 2006/0161667 A1 * | 7/2006 | Umesawa et al. | 709/229 |
| 2006/0248180 A1 * | 11/2006 | Bernardi et al. | 709/223 |
| 2006/0277275 A1 * | 12/2006 | Glaenzer | 709/219 |
| 2006/0294194 A1 * | 12/2006 | Graveline et al. | 709/217 |
| 2007/0055781 A1 * | 3/2007 | Fleischer et al. | 709/227 |
| 2007/0250833 A1 * | 10/2007 | Araujo et al. | 718/1 |
| 2007/0300289 A1 | 12/2007 | Tanizawa et al. | |
| 2008/0037571 A1 * | 2/2008 | Hetzel et al. | 370/408 |
| 2008/0072311 A1 * | 3/2008 | Mullick et al. | 726/15 |
| 2008/0104675 A1 | 5/2008 | Kusano et al. | |

(Continued)

OTHER PUBLICATIONS

Oracle (TM) VM server user's guide; release 2.2, chap. 4: Creating a guest virtual machine, 11 pages , 2011.*

(Continued)

*Primary Examiner* — Catherine Thiaw

(57) ABSTRACT

In response to requests from a manager to the agents for connections to the applications executing, the agents authenticate the manager. In response to the authenticating, the agents establish connections to the applications. In response to the establishing of connections, the agents provide the connections to the manager.

10 Claims, 5 Drawing Sheets

(56) References Cited

U.S. PATENT DOCUMENTS

| | | | |
|---|---|---|---|
| 2008/0155250 A1 | 6/2008 | Tanizawa et al. | |
| 2008/0222412 A1* | 9/2008 | Hu | 713/156 |
| 2008/0275992 A1* | 11/2008 | Basty et al. | 709/227 |
| 2009/0037593 A1* | 2/2009 | Curtis | 709/229 |
| 2009/0063687 A1* | 3/2009 | Turk | 709/227 |
| 2009/0106834 A1* | 4/2009 | Borzycki et al. | 726/21 |
| 2009/0282471 A1* | 11/2009 | Green et al. | 726/12 |
| 2010/0064063 A1* | 3/2010 | Deforche et al. | 710/5 |
| 2010/0088507 A1* | 4/2010 | Cho | 713/156 |
| 2010/0290424 A1* | 11/2010 | Collingrige | 370/329 |
| 2011/0119738 A1* | 5/2011 | Piepenbrink et al. | 726/4 |

OTHER PUBLICATIONS

Oracle -Base: 'OS Auhentication', 2006, http://www.oracle-base.com/articles/misc/os-authentication.php.*

Sechang Son and Miron Livny: "Recovering Internet Symmetry in Distributed Computing", Proceedings of the 3rd IEEE/ACM International Symposium on Cluster Computing and the Grid (CCGRID03), 2003, 8 pages.*

* cited by examiner

APPLICATION-ACCESS AUTHENTICATION AGENT

BACKGROUND

In several fields, including financial and medical services, data security is a paramount concern. Laws and best practices often dictate that sensitive data be protected by security schemes, e.g., involving certificates and passwords for authentication to access a database or other application. System managers keep track of authentication data, e.g., regarding certificates and passwords, so that they can update and otherwise manage secure applications.

BRIEF DESCRIPTION OF THE DRAWINGS

The following figures represent examples.

DETAILED DESCRIPTION

Data centers and large-scale enterprise systems can have hundreds or thousands of servers running comparable numbers of application instances. Keeping track of authentication data for all the servers and applications can be a challenge, especially if, as may be mandated, the authentication is different for each application and each server. The challenge is further aggravated by regular updating of the authentication data for each application.

Figure 1:
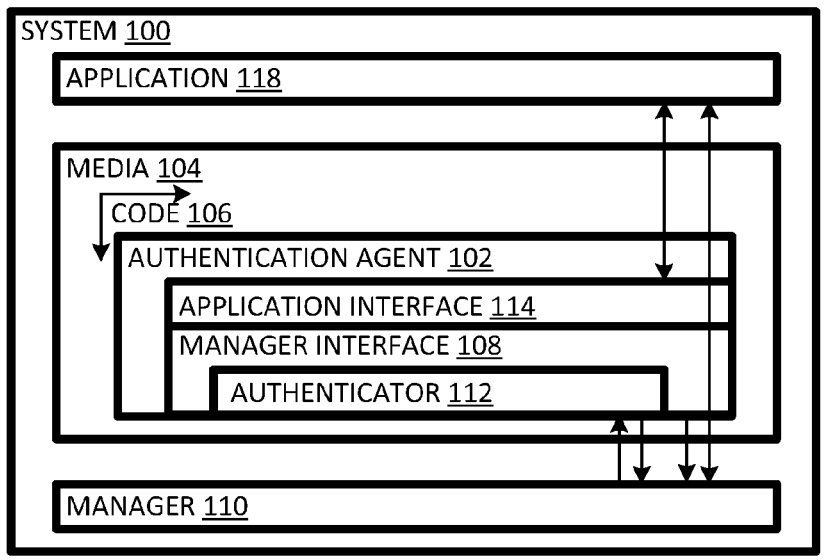
FIG. 1 is a schematic diagram of a secure system in accordance with an example.
Figure 2:
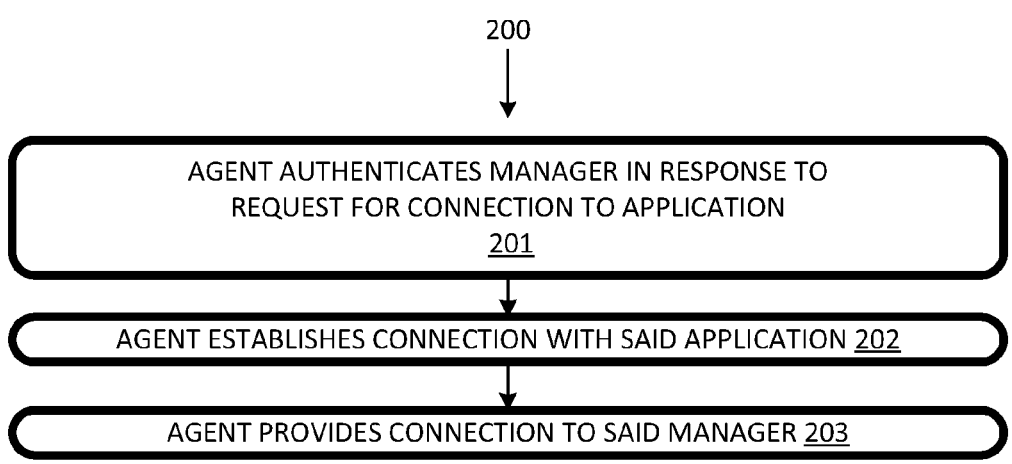
FIG. 2 is a flow chart of a secure process in accordance with an example.

A system 100 addresses this challenge by providing an authentication agent 102. Authentication agent 102 provides for a process 200, flow charted in FIG. 2. At 201, the agent authenticates a manager (e.g., human and computer operated by the human) in response to a manager request for a connection to the application. At 202, in response to the authentication, the authenticated agent establishes a connection with the application. At 203, the agent provides this connection to the manager so that the manager can communicate with the application.

Accordingly, system 100 includes non-transitory storage media 104 encoded with code 106. Code 106, when executed by a processor, defines the structure and functionality of agent 102. Agent 102 includes a manager interface 108 for interfacing with a manager 110. Manager interface 108 includes an authenticator 112 for authenticating manager 110. Agent 102 further includes an application interface 114 for interfacing with a target application 118.

Figure 3:
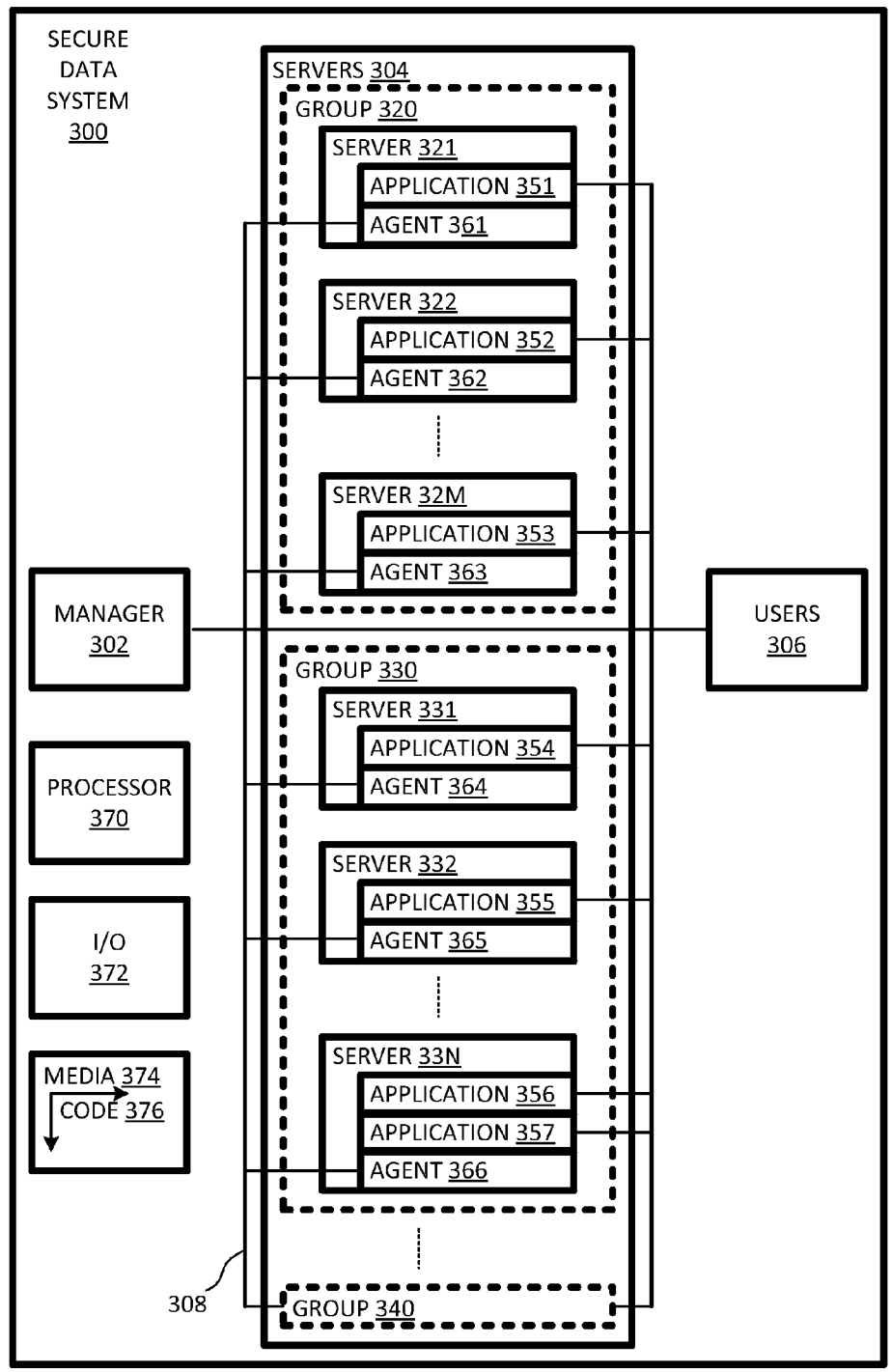
FIG. 3 is a schematic diagram of another secure system in accordance with an example.

Use of an authentication agent for authenticating a manager to communicate with an application decouples manager authentication from user authentication. This decoupling permits a separate and more scalable authentication system to be used for management purposes. The advantages of using scalable authentication are most salient in large systems, such as system 300 of FIG. 3, with many applications to manage.

Secure data system 300 includes a manager 302, servers 304, users 306, and a network 308. Manager 302 and users 306 access servers 304 over network 308. In another example, managers and users access servers 304 over separate networks.

Servers 304 are arranged in groups 320, 330, . . . 340, the ellipsis indicating additional groups. Group 320 includes servers 321, 322, . . . 32Q, the ellipsis indicating additional servers. Group 330 includes servers 331, 332, . . . 33N, the ellipsis indicating additional servers. In other examples, there can be one or more groups and one or more servers in each of the groups.

Each server hosts one or more applications or application instances: for example, server 321 hosts application 351, server 322 hosts application 352, server 32M hosts application 353, server 331 hosts application 354, server 332 hosts application 355, and server 33N hosts applications 356 and 357. Each server hosts one authentication agent: for example, server 321 hosts agent 361, server 322 hosts agent 362, server 32M hosts agent 363, server 331 hosts agent 364, server 332 hosts agent 365, server 33N hosts agent 366. In other examples, there may be servers: 1) not executing applications or agents; or 2) executing more than one authentication agent.

Advantageously, while user credentials may be required for different applications, all the servers of a group may use the same or related credentials to access agents in that group. For example, agents 361, 362, 363 may accept the same credentials. Alternatively, the credentials they accept may be different but redundancy-related. For example, they may use the same certificates but different passwords, or may use related passwords, e.g., derived by adding the same value to each of the server's MAC (Media Access Control) addresses.

By controlling the number of server groups and the relatedness of the credentials required to access agents, a manager may limit the complexity of keeping track of the credentials for managing secure data system 300. Thus, the complexity to be handled by manager 302, e.g, as secure data system 300 expands, scales in a manageable fashion.

Figure 4:
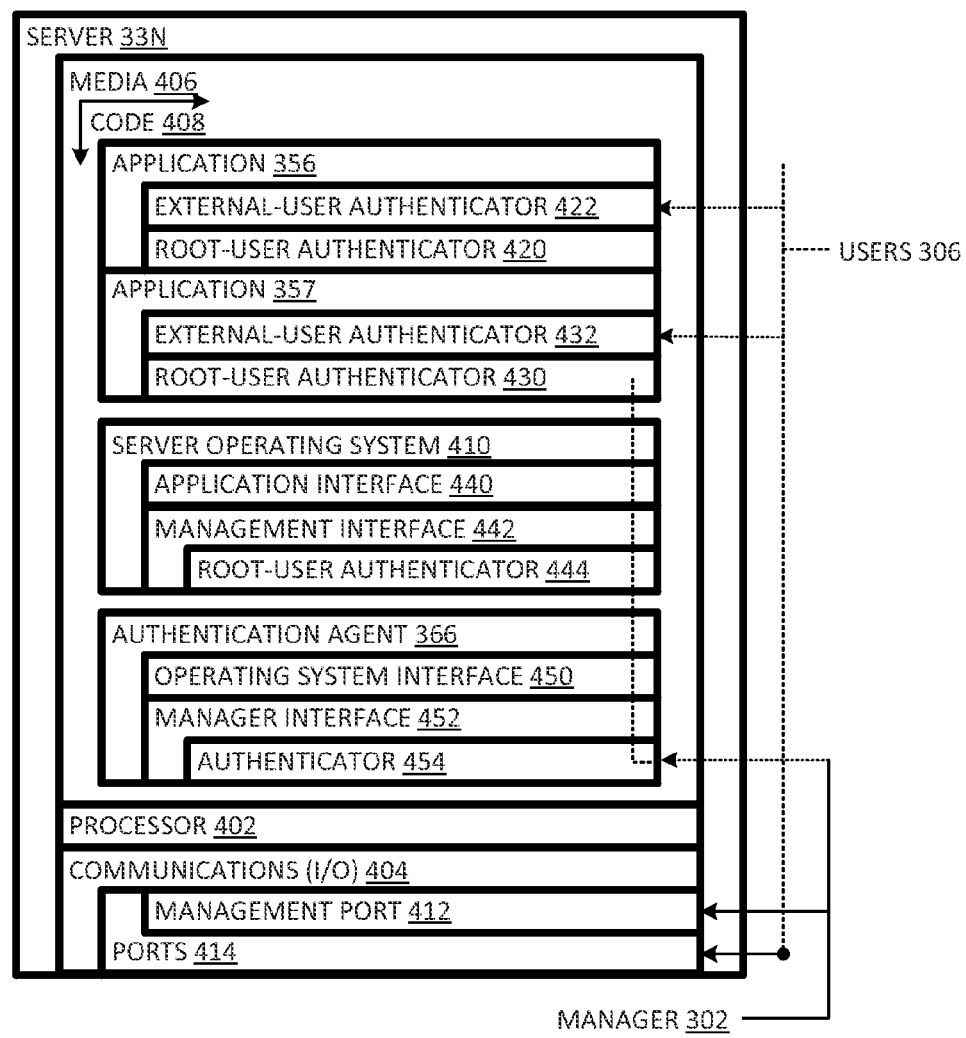
FIG. 4 is an example of a server.

Server 33N is shown in detail in FIG. 4 including a processor 402, communications devices 404, and storage media 406. Storage media 406 is encoded with code 408 that, when executed by processor 402, defines the functionalities of operating system 410, agent 366, and applications 356 and 357. Communications devices 404 includes network devices and input/output devices (e.g., keyboard, mouse, and display interfaces). The network devices include network ports 412. Operating system 410 virtualizes network ports to define virtual network ports, including a management port 414. Application 356 includes a root-user authenticator 420 and an external-user authenticator. Application 357 likewise includes a root-user authenticator 430 and an external-user authenticator 432.

Application 356 may be, for example, an instance of a medical-records application or of a database customized to function as a medical-records application. In this example, the clients would be medical staff who need to check and update patients' medical records. Requests for access to a patient's medical records would be processed by external-user authenticator 422, which could require the user to enter a user name and password. External-user authenticator 422 uses the user name to identify who the user claims to be and verify that that user has the authority to do what that user is requesting to do, and uses the password to verify that the user is who the user claims to be.

In this expository example, application 357 could be an analytics program that analyzes the contents of application 356 (e.g., medical records) and provides medical statistics (that do not identity any individual identities or records). Such statistics might be used by hospital administrators for planning purposes or by medical researchers for research purposes. Hospital administrators and medical researchers would access analytical application 357 via its client-user authenticator, which would require users to enter user names and passwords for authentication.

Server operating system 410 includes an application interface 440 and a management interface 442. Application interface 440 interfaces with applications 356 and 357 so that applications can have access to server hardware (e.g., processor 402, communications devices 404, and media 406) via operating system 410. Management interface 442 includes a root-user authenticator 444. Root user authenticator can use user name plus password protection to authenticate root users, e.g., a manager requesting access for installing or updating an application or agent.

An application installed using root-user privileges may or may not itself be given root-user privileges so that it can access other applications. For example, analytics application 357 can be installed with root-user privileges for accessing medical-records application 356. When analytics application 357 attempts to access medical-records application 356, medical-records root-user authenticator 420 authenticates analytics application 357 by checking with server operating system 410 to confirm that analytical application 357 has the privileges to access medical-records application 356. The advantage is that analytical application 357 does not have to authenticate itself to medical-records application 356; instead, medical-records application 356 can rely on the authentication involved at installation time for analytical application 357. Analytical application 357 shields medical-records application 356 from the clients of analytical application 357.

Authentication agent 366 will have been installed using root-user authentication. The installation would specify that authentication agent 366 would have root-user privileges to access applications 356 and 357. Authentication agent 366 can thus access applications 356 and 357 using operating system interface 450. Applications 356 and 357 would authenticate authentication agent 366 using their root-user authenticators 420 and 430, which rely on operating system 410 to confirm the identity and privilege level of authentication agent 366. Thus, authentication agent 366 is relieved of having to authenticate itself to applications 356 and 357.

A manager 302 seeking to update application 366, for example, would have three methods available. First, the manager could access application 356 using external-user authenticator 422, which would require submission of a user name and password; the problem here is that different passwords might be required for different applications including those running on different servers; a manager would have to keep track of multiple passwords, which might be changed periodically. Second, the manager could access application 356 as a root user. The problem here is that the manager would have to authenticate to the operating system, e.g., by submitting a username and password; this again raises the problem of managing different passwords for different servers.

The third method is to authenticate to agent 366, which would rely on prior operating system authentication for authentication to application 356 via its root-user authenticator 420. The manager could authenticate to agent authenticator using a certificate or combination of certificate and password. However, any password might not be required to be unique, while the use of the certificate would provide a high level of security since certificates are more complex and time-consuming to crack than most passwords. Generating certificates is a more complex process than generating passwords, but the additional complexity would be well within the skill-level of those involved in managing secure data system 300. Thus, the use of agent 366 reduces the burden of manager 302 to manage authentication data while maintaining a high level of security for secure data system 300.

Figure 5:
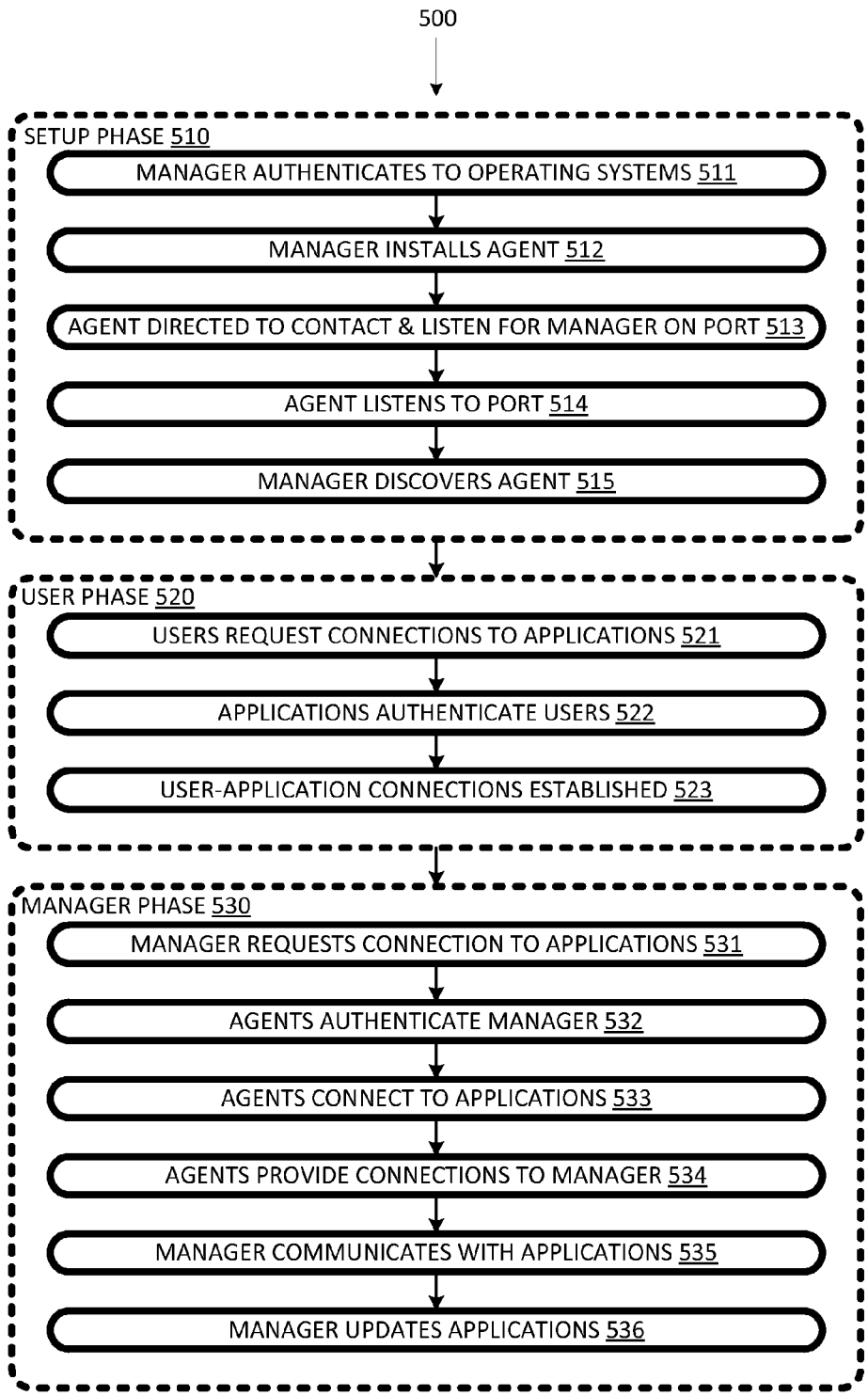
FIGS. 5 and 6 are examples of secure processes implementable on the system of FIG. 3.

Code 376, which includes code 408, when executed by processor 370, which includes processor 402, provides for a process 500, flow-charted in FIG. 5. Process 500 includes a setup phase 510, a user phase 520, and a manager phase 530.

At 511 of setup phase 510, a manager, e.g., manager 302, authenticates to operating systems, e.g., operating system 410 of server 33N, for root-user access. Plural operating systems are indicated as the manager may manage plural servers, each with its own operating system. The authentications can occur at different times. Typically, the root-user or administrator authentication (e.g., by a server and its operating system) involves using usernames and passwords.

At 512, once authenticated, manager 302 installs agents, e.g., agent 366, on respective servers, e.g., server 33N, and provides the agents with appropriate permissions to access target applications, e.g., applications 356 and 357. At 513, installed agents are directed to contact and listen for the manager on specified virtual ports. At 514, the agents listen for the manager on the specified virtual ports. At 515, the manager discovers the agents.

At 521 of user phase 520, users request access or connections to applications. At 522, the applications authenticate the users. Typically, this authentication involves user names and passwords. Note that each application may require passwords to be changed periodically. Also, regulations and policies may require different passwords for different applications and/or different passwords for every server.

For example, the authentication schemes for applications 356 and 357 may involve not only different credentials but different credential types, e.g., each may or may not require a certificate, a password, a user name, an email address, etc. This may be bearable for users where each user only accesses a few of the applications, but would be a burden for a manager responsible for managing all applications in system 300. At 523, connections are established between users and applications, e.g., so that the users can use the applications.

At 531 of manager phase 530, a manager 302 requests connections to applications, e.g. applications 356 and 357. These requests may and would in general occur at different times. Also, the person involved as manager could be different for different requests. Further, the persons involved in requesting connections to applications can and might well be different than the person involved in installing the agent.

At 532, in response to the request, the agents authenticate the manager. At 533, the agents connect to the applications. In practice, this authentication may be performed using a certificate. So that process 500 is scalable, one certificate can be used for all applications. Alternatively, the applications can be grouped and the application of each group can share group-specific certificates.

Figure 6:
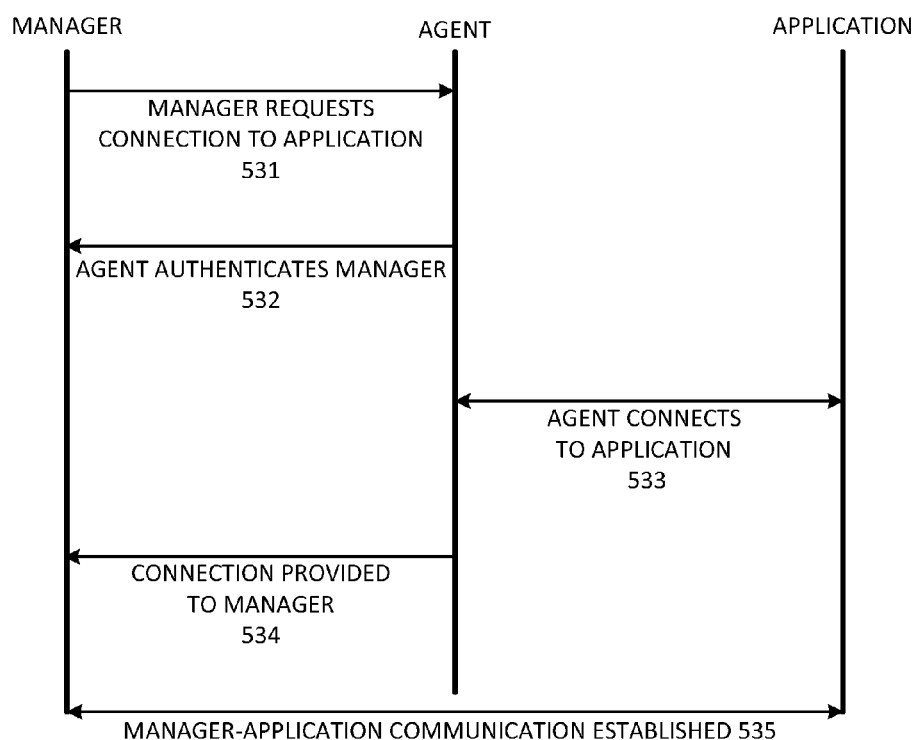

At 534, the agents provide connections to the manager. At 535, the manager uses the provided connections to communicate with the applications. Actions 531-535 are also represented in the flow diagram of FIG. 6. At 536 (FIG. 5), the manager updates the applications or performs other managerial tasks with respect to the accessed applications.

Herein, a "system" is a set of interacting non-transitory tangible elements, wherein the elements can be, by way of example and not of limitation, mechanical components, electrical elements, atoms, physical encodings of instructions, and process actions. Herein, "process" refers to a sequence of actions resulting in or involving a physical transformation. "Storage medium" and "storage media" refer to a system including non-transitory tangible material in or on which information is or can be encoded so as to be readable by a computer. Herein, a processor is hardware designed to execute computer-executable instructions.

Herein, an "application" is a program, together with associated data structures and non-instruction data, that is intended primarily as a tool for human users; "application" is contrasted with "utility" that primarily runs in the background and servers management purposes. Strictly speaking, an "application" is a product and an "application instance" is an instance of that product, e.g., installed on a particular machine. However, as is apparent from context, "application" is used as a short hand for "application instance" in several places herein.

Herein, "authentication" is an act of determining that a person or agent is who the person or agent purports to be and that the person or agent is authorized to perform the acts the person or agent requests to perform. Herein, "manager" refers to a combination of human, machine, and software that manages computer hardware and/or software. In other words, "manager" denotes a role that may be filled by different people and different machines at different times. Herein, "agent" refers to a software-defined entity executing on a managed computer that serves the purposes of a manager.

In this specification, related art is discussed for expository purposes. Related art labeled "prior art", if any, is admitted prior art. Related art not labeled "prior art" is not admitted prior art. In the claims, "said" introduces elements for which there is explicit verbatim antecedent basis in the claims, while "the" introduces elements for which the antecedent basis may be implicit. The illustrated and other described embodiments, as well as modifications thereto and variations thereupon are within the scope of the following claims.

What is claimed is:

1. A process comprising:
In response to requests from a manager for connections to applications executing on servers, authenticating said manager by agents executing using a processor on said servers, said agents having root-level access privileges to said applications, different passwords being required for root level access to each of said servers and each of said applications, a same certificate being used in authenticating said manager by each of said agents on said servers;
in response to said authenticating, establishing, using said root-level access privileges, connections to said applications by said agents; and
in response to said establishing, providing, by said agents to said manager said connections to said applications;
prior to said authenticating of said manager by said agents, authenticating, by said servers, said manager.

2. A process as recited in claim 1 further comprising:
in response to said authenticating by said servers, said manger installing said agents on said servers.

3. A process as recited in claim 2 further comprising, prior to said authenticating of said manager by said agents, said agents listening for said manager on specified virtual ports and not on other virtual ports.

4. A process as recited in claim 1 further comprising said manager updating said applications using said connections.

5. A process as recited in claim 1 wherein said establishing includes bypassing external-user authenticators included in said applications and used to authenticate users to said applications.

6. A system comprising: storage media encoded with code that, when executed by processors, implements plural agents on plural servers, said agents accepting a same certificate for authentication, each of said agents including:
a manager interface to interface with a manager to receive or fulfill a request by said manager for access to an application executing on a same server as said agent, said manager interface including an authenticator for authenticating said manager using said certificate not required by said application and not required by an operating system executing on said server for root-level access; and
an application interface to provide, using root-level access privileges of said agent to said application, a connection between said agent and said application so that said manager interface provides, in response to said request, a connection between said manager and said application.

7. A system as recited in claim 6 further comprising said processor.

8. A system as recited in claim 6 wherein said code further implements said application, said application including an external-user authenticator for authenticating a user requesting access to said application, said agent being configured to bypass said user authenticator when providing said connection.

9. A system as recited, in claim 6 wherein said code further implements an operating system executing on said server, said operating system including an authenticator to authenticate said manager for the purpose of installing said agent, said authenticator requiring a password for root-level access to said application, said password not being required by said agent to authenticate said manager.

10. A system as recited in claim 6 wherein said code further implements each of said agents having an authenticator that uses said certificate to authorize said manager.

* * * * *

UNITED STATES PATENT AND TRADEMARK OFFICE
CERTIFICATE OF CORRECTION

| | | |
|---|---|---|
| PATENT NO. | : 8,844,015 B2 | Page 1 of 1 |
| APPLICATION NO. | : 13/362290 | |
| DATED | : September 23, 2014 | |
| INVENTOR(S) | : Eric Addkison Pendergrass et al. | |

It is certified that error appears in the above-identified patent and that said Letters Patent is hereby corrected as shown below:

In The Claims

In column 5, line 35, in Claim 1, delete "In" and insert -- in --, therefor.

In column 5, line 47, in Claim 1, delete "providing," and insert -- providing --, therefor.

In column 6, line 39, in Claim 9, delete "recited," and insert -- recited --, therefor.

Signed and Sealed this
Tenth Day of February, 2015

Michelle K. Lee
*Deputy Director of the United States Patent and Trademark Office*